May 28, 1963 W. V. TYRLICK 3,091,664

DELTA MODULATOR FOR A TIME DIVISION MULTIPLEX SYSTEM

Filed April 24, 1961 2 Sheets-Sheet 1

INVENTOR.
WILLIAM V. TYRLICK
BY George J. Seligsohn
ATTORNEY

May 28, 1963 W. V. TYRLICK 3,091,664

DELTA MODULATOR FOR A TIME DIVISION MULTIPLEX SYSTEM

Filed April 24, 1961 2 Sheets-Sheet 2

United States Patent Office 3,091,664
Patented May 28, 1963

3,091,664
DELTA MODULATOR FOR A TIME DIVISION MULTIPLEX SYSTEM

William V. Tyrlick, Rochester, N.Y., assignor to General Dynamics Corporation, Rochester, N.Y., a corporation of Delaware Filed Apr. 24, 1961, Ser. No. 105,122
9 Claims. (Cl. 179—15)

This invention relates to a time division multiplex switching system and, more particularly, to such a system utilizing delta modulation for transmitting time multiplexed information to a receiving point in digital form.

It is often necessary to transmit time multiplexed analog signals from an originating point at which they are derived to a receiving point at which they are utilized. One well known scheme for transmitting this information is the use of a resonant transfer. However, the use of resonant transfer creates the problem of maintaining the amplitude and power of each time multiplexed sample, as well as the time position thereof. This problem may be overcome by converting the analog information to digital information at the originating point, transmitting the digital information to the receiving point, and converting the digital information back to analog information. However, this is not too practical since a code consisting of a plurality of bits is necessary to manifest each of the signal levels of the time multiplexed analog samples.

The present invention, by utilizing delta modulation, makes it possible to transmit the desired information from the originating point to the receiving point with a single bit code.

It is, therefore, an object of the present invention to utilize delta modulation for transmitting time multiplexed analog samples from an originating point to a receiving point.

This and other objects, advantages and features of the present invention will become more apparent from the following detailed description taken together with the accompanying drawings, in which.

Figure 1:
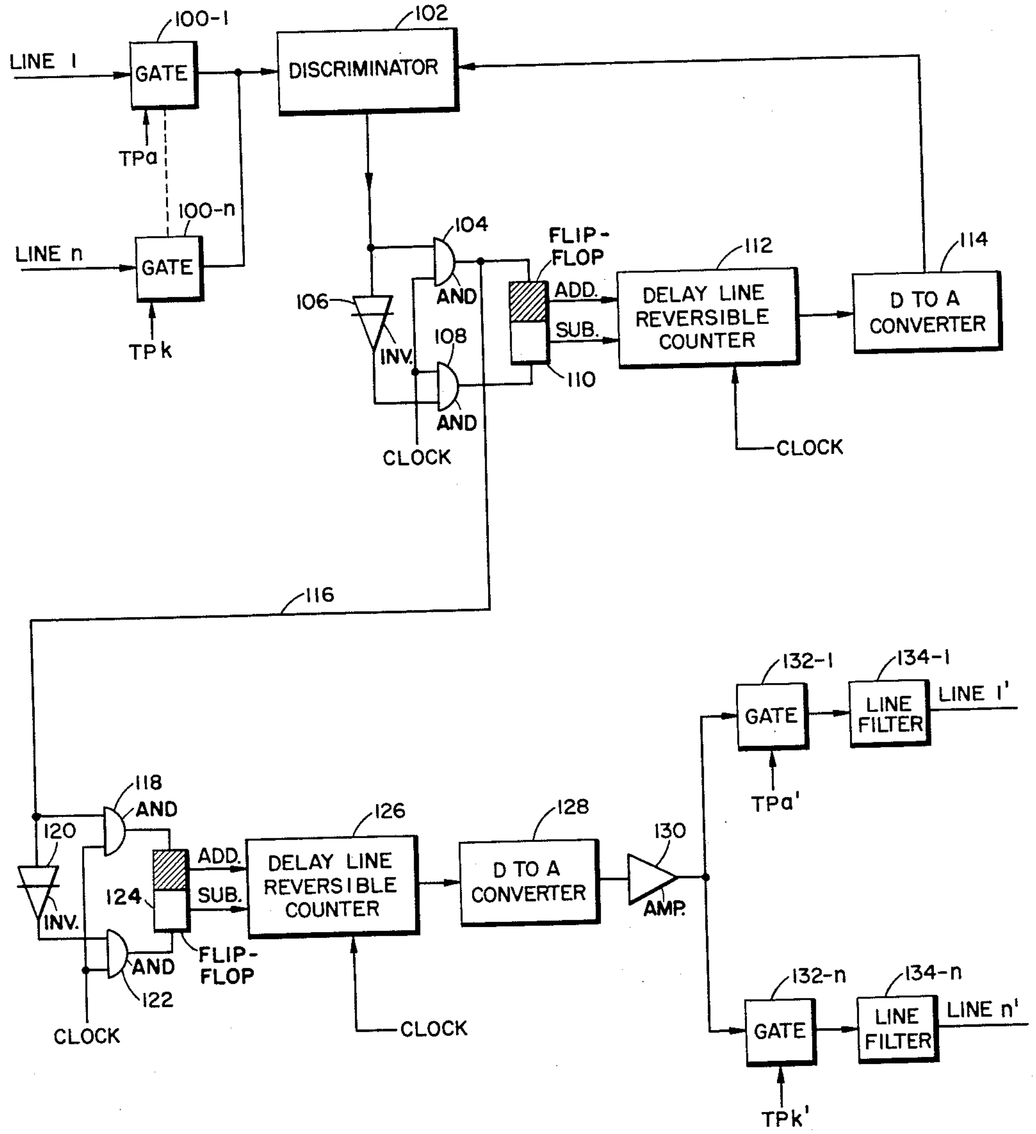
FIG. 1 is a block diagram of a preferred embodiment of the invention.

Referring to FIG. 1, there is shown a plurality of lines consisting of line 1 to line *n*, on any of which may be placed an analog signal. As shown, each of the lines is applied as a first input to an associated analog signal sampling gate, line 1 being applied as a first input to gate 100–1 and line *n* being applied as a first input to gate **100–*n***.

In accordance with well known time division multiplexing practice, each gate is alotted a different time slot and a respective timing pulse occurring in the appropriate time slot is periodically applied to each gate once each frame period. As shown, timing pulse TP*a* is applied to gate 100–1 and timing pulse TP*k* is applied to gate **100–*n***. Each of the gates is opened only in response to the application of a timing pulse thereto to provide samples of the signal level of the analog signal applied thereto each time a gate is opened.

Thus, time multiplexed samples of the various applied analog signals appear at the outputs of gates 100–1 to **100–*n*, which are multipled, as shown, and applied as a first input to discriminator 102**.

Discriminator 102 is a device for comparing the relative magnitudes of signals applied to a first input and to a second input thereof and producing a fixed magnitude output only in response to the magnitude of the first input exceeding the magnitude of the second input. Discriminator 102, for instance, may consist of a normally cutoff high gain switching amplifier to which a first input is applied tending to switch the amplifier on while a second input is applied tending to maintain the amplifier off. Therefore, when the magnitude of the first input exceeds the magnitude of the second input the amplifier is turned on, and an output is derived, and when the magnitude of the second input exceeds the magnitude of the first input, the amplifier is maintained off and no output is derived.

The output from discriminator 102 is applied directly as a first input to AND gate 104 and is applied through inverter 106 as a first input to AND gate 108. Clock pulses, from a source not shown, are applied as second inputs to both AND gates 104 and 108.

The output of AND gate 104 is applied as a first input to a bistable device, such as flip-flop 110, to effect the switching of flip-flop 110 to a first stable condition thereof. The output from AND gate 108 is applied as a second input to flip-flop 110 to effect the switching of flip-flop 110 to a second stable condition thereof.

When flip-flop 110 is in its first stable condition, an add control signal is applied to delay line reversible counter 112. When flip-flop 110 is in its second stable condition, a subtract control signal is applied to delay line reversible counter 112. Clock pulses, from a source not shown, are applied as an input to delay line reversible counter 112.

The output from delay line reversible counter 112 is applied as an input to digital to analog converter 114. The output from digital to analog converter 114 is applied as the second input to discriminator 102.

The output from AND gate 104 is also applied through a transmission path 116 extending to a receiving point where it is applied directly as a first input to AND gate 118 and through inverter 120 as a first input to AND gate 122. Clock pulses from a source not shown are applied as second inputs to both AND gates 118 and 122.

The output of AND gate 118 is applied as a first input to a bistable device, such as flip-flop 124, to effect the switching thereof to a first stable condition and the output of AND gate 112 is applied as a second input to flip-flop 124 to effect the switching thereof to a second stable condition. In response to flip-flop 124 being in its first stable condition, an add control signal is applied to delay line reversible counter 126. In response to flip-flop 124 being in its second stable condition, a subtract control signal is applied to delay line reversible counter 126. Clock pulses from a source not shown are also applied to delay line reversible counter 126.

The output of delay line reversible counter 126 is applied through digital to analog converter 128 and amplifier 130 as a first input to a plurality of analog gates, such as gate 132–1 and gate **132–*n***.

Demultiplexing is accomplished by applying timing pulses, such as TP*a'* and TP*k'*, to the analog gates in appropriate time slots. The output of each gate is passed through an individual line filter, such as line filter 134–1 and **134–*n*, to an individual line coupled thereto, such as line 1'** and line *n'*.

Figure 2:
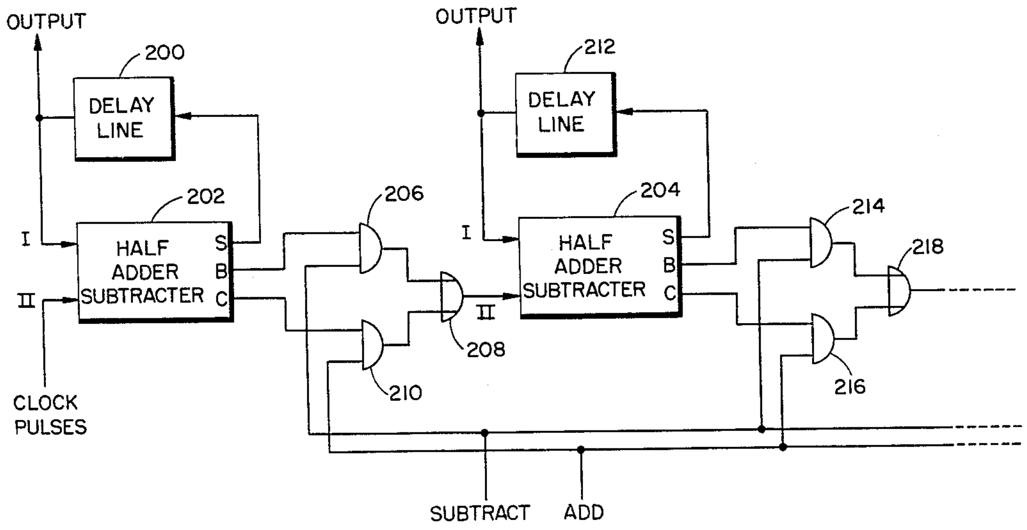
FIG. 2 is a block diagram of a delay line reversible counted shown in FIG. 1.

Referring now to FIG. 2, which shows a block diagram of a delay line reversible counter, such as delay line reversible counter 112 and 126, a reversible delay line counter consists of a plurality of cascaded stages, only the first two of which are shown.

Each stage consists of a half adder subtracter and a delay line having a delay equal to one frame period. As shown, the output of delay line 200 of the first stage is applied as a first input to half adder subtracter 202 and clock pulses are applied as a second input to half adder subtracter 202. Half adder subtracter 202 has a sum output, designated S, a borrow output designated B and a carry output designated C. The sum output is applied as an input to delay line 200 to be recirculated. The borrow output of half adder subtracter 202 is applied as a second input to half adder subtracter 204 through normally closed AND gate 206, which is opened only in response to the presence of a subtract control signal, and OR gate 208. The carry output of half adder subtracter 202 is applied as a second input to half adder subtracter 204 through normally closed AND gate 210, which is opened only in response to the presence of an add control signal, and OR gate 208.

The output of delay line 212 is applied as a first input to half adder subtracter 204.

In a manner similar to half adder subtracter 202, the sum output of half adder subtracter 204 is applied as an input to delay line 212 and the borrow and carry outputs of half adder subtracter 204 are applied through AND gates 214 and 216 and OR gate 218, which correspond, respectively, to AND gates 206, 210, and OR gate 208 to the next stage of the delay line reversible counter, not shown.

The output of the delay line reversible counter is obtained, as shown, at the outputs of the respective delay lines, such as delay line 200 and delay line 212.

Figure 3:
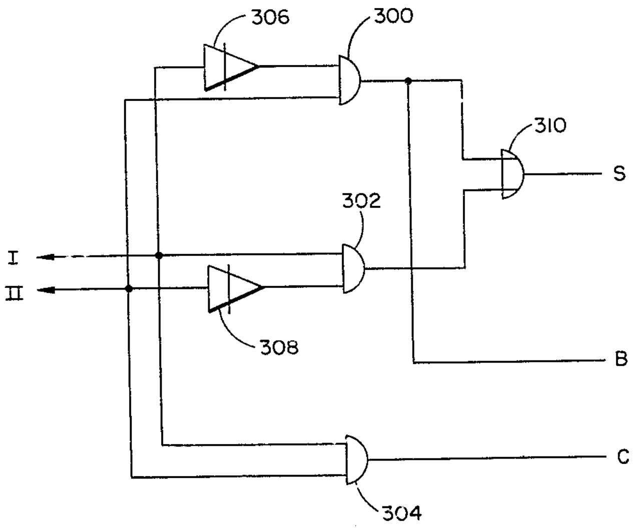
FIG. 3 is a block diagram of a half adder subtracter shown in FIG. 2.

Referring now to FIG. 3, there is shown one embodiment of a half adder subtracter. As shown, a half adder subtracter consists of AND gates 300, 302 and 304. The first input to the half adder subtracter is applied directly as a first input to AND gates 302 and 304 and through inverter 306 as a first input to AND gate 300. The second input to the half adder subtracter is applied directly as a second input to AND gates 300 and 304 and through inverter 308 as a second input to AND gate 302. The outputs of AND gates 300 and 302 are passed through OR gate 310 to obtain the sum output. The borrow output is obtained at the output of AND gate 300 and the carry output is obtained at the output of AND gate 304.

Considering the operation of the circuits shown in FIG. 1, the loop consisting of discriminator 102, AND gate 104, inverter 106 and AND gate 108, flip-flop 110, delay line reversible counter 112 and digital to analog converter 114 provide means for tracking the signal level of each time multiplexed analog sample applied to discriminator 102. Due to the delay of one frame period provided by delay line reversible counter 112, the output from delay line reversible counter 112 manifests in binary form the approximate value of the signal level of a time multiplexed sample existing in a previous frame period. This binary output is converted to an equivalent analog signal level by digital to analog converter 114 and compared by discriminator 102 to the signal level of the corresponding time multiplexed analog sample existing in a present frame. If the signal level of the time multiplexed analog sample of the present frame exceeds that of the previous frame, the binary number stored in delay line reversible counter 112 is increased by one unit. This, in turn, causes digital to analog converter 114 to apply an incrementally higher analog signal level to discriminator 102 during the next frame period. If, on the other hand, the analog signal level of the previous frame exceeds the signal level of the time multiplexed analog sample of the present frame, the binary number stored in delay line reversible counter 112 is reduced by one unit. This, in turn, causes the digital to analog converter 114 to apply an incrementally lower analog signal level to discriminator 102 during the next frame. It will be seen that delay line reversible counter 112 acts as an integrator in which the binary number is equal to the total number of added units accumulated minus the total number of subtracted units accumulated. However, the only information appearing on transmission path 116 is either the presence of a pulse, manifesting an increase in the signal level of a time multiplexed analog sample, or the absence of a pulse, manifesting a decrease in the signal level of a time multiplexed analog sample.

At the receiving point, delay line reversible counter 126 integrates the successive bits supplied over transmission path 116, and through digital to analog converter 128 provides a signal level which follows the signal level of the original time multiplexed analog samples. After demultiplexing by gates 132–1 to **132–*n* and smoothing by line filters 134–1 to 134–*n***, the original analog signals are reconstructed.

Although only a preferred embodiment of this invention has been described in detail herein, it is not intended that the invention be restricted thereto, but that it be limited only by the true spirit and scope of the appended claims.

What is claimed is:

1. In a time division multiplex system having a given frame period, a plurality of analog signal sources, time multiplex means for sequentially sampling each of said sources each frame period, first means coupled to said time multiplex means, said first means including delay means having a delay equal to one frame period for sequentially comparing the relative levels of the time multiplexed samples of each individual analog signal applied thereto during successive frames to produce a momentary output signal having a respective one of first and second predetermined values in accordance with whether the level of the sample of that individual analog signal during a frame is greater or smaller than the level of the sample of that individual analog signal during the previous frame, second means for transmitting successive output signals to a receiving point, and third means including demultiplexing means at said receiving point having said successive output signals applied as an input thereto for reconstructing said analog signals in accordance with the respective values of each of said successive output signals.

2. The system defined in claim 1, wherein said first means includes a delay line reversible counter having a delay equal to one frame period for adding clock pulses applied thereto in response to a concurrently applied add control signal and for subtracting clock pulses applied thereto in response to a concurrently applied subtract control signal, a discriminator producing a fixed amplitude output pulse only in response to the level of a first input applied thereto exceeding the level of a second input applied thereto, means for applying time multiplexed samples of analog signals as said first input to said discriminator, a digital to analog converter coupling the output of said counter to said discriminator for applying as said second input to said discriminator a signal level proportional to the count manifested by the output of said counter, and control means coupling said discriminator to said counter for applying an add control signal to said counter in response to an output pulse from said discriminator and for applying a subtract control signal to said counter in response to the absence of an output pulse from said discriminator, and wherein said second means includes means for transmitting the output of said discriminator to said receiving point.

3. The system defined in claim 2, wherein said control means includes a bistable device for producing said add control signal in response to a first stable condition thereof and for producing said subtract control signal in response to a second stable condition thereof, first and second AND gates, means for directly applying the output of said discriminator as a first input to said first AND gate, an inverter for applying the output of said discriminator as a first input to said second AND gate, means for applying clock pulses as a second input to both said first and second AND gates, means for applying the output of said first AND gate to a first input of said bistable device to switch said bistable device to said first stable condition thereog, and means for applying the output of said second AND gate to a second input of said bistable device to switch said bistable device to said second stable condition thereof.

4. The system defined in claim 3, wherein said second means includes means for transmitting the output of one of said AND gates to said receiving point.

5. The system defined in claim 4, wherein said one of said AND gates is said first AND gate.

6. The system defined in claim 1, wherein said third means includes a delay line reversible counter having a delay equal to one frame period for adding clock pulses applied thereto in response to a concurrently applied add control signal and for subtracting clock pulses applied thereto in response to a concurrently applied subtract control signal, control means having said successive output signals applied as an input thereto for applying an add control signal to said counter in response to an output signal having said first predetermined value and for applying a subtract control signal to said counter in response to an output signal having said second predetermined value, and a digital to analog converter coupled to the output of said counter for producing a signal level proportional to the count manifested by the output of said counter.

7. The system defined in claim 6, wherein an output signal having said first predetermined value is a pulse of fixed amplitude and an output signal having said second predetermined value is the absence of a pulse.

8. The system defined in claim 7, wherein said control means includes a bistable device for producing said add control signal in response to a first stable condition thereof and for producing said subtract control signal in response to a second stable condition thereof, first and second AND gates, means for directly applying said output signals as a first input to said first AND gate, an inverter for applying the output of said discriminator as a first input to said second AND gate, means for applying clock pulses as a second input to both said first and second AND gates, means for applying the output of said first AND gate to a first input of said bistable device to switch said bistable device to said first stable condition thereof, and means for applying the output of said second AND gate to a second input of said bistable device to switch said bistable device to said second stable condition thereof.

9. The system defined in claim 1, wherein said first means includes a delay means reversible counter having a delay equal to one frame period for adding clock pulses applied thereto in response to a concurrently applied add control signal and for subtracting clock pulses applied thereto in response to a concurrently applied subtract control signal, a discriminator producing a fixed amplitude output pulse only in response to the level of a first input applied thereto exceeding the level of a second input applied thereto, means for applying time multiplexed samples of analog signals as said first input to said discriminator, a digital to analog converter coupling the output of said counter to said discriminator for applying as said second input to said discriminator a signal level proportional to the count manifested by the output of said counter, and control means coupling said discriminator to said counter for applying an add control signal to said counter in response to an output pulse from said discriminator and for applying a subtract control signal to said counter in response to the absence of an output pulse from said discriminator, and wherein said second means includes means for transmitting the output of said discriminator to said receiving point.

References Cited in the file of this patent

UNITED STATES PATENTS

| | | |
|---|---|---|
| 2,510,054 | Alexander et al. | June 6, 1950 |
| 2,662,113 | Schouten et al. | Dec. 8, 1953 |
| 2,759,998 | Labin et al. | Aug. 21, 1956 |